3,753,924
RUST INHIBITOR CONTAINING TANNINS WITH A CHELATION CATALYST AND A CROSS-LINKING AGENT

Rene P. Franiau, Wetteren, Belgium, assignor to S.A. PRB Societe Anonyme, Brussels, Belgium
No Drawing. Filed Sept. 16, 1970, Ser. No. 73,179
Claims priority, application Belgium, Jan. 27, 1970, 49,855
Int. Cl. C23f 11/18, 11/14, 11/10
U.S. Cl. 252—389 R
9 Claims

ABSTRACT OF THE DISCLOSURE

The invention pertains to a rust inhibitor consisting of tannic acid and additives, said inhibitor comprising at least a tannic acid, a catalyst capable of initiating the chelation of iron atoms and cross-linking gent.

---

This invention relates to a product for protecting iron against corrosion. This product relies upon the chelating property of iron with natural organic compounds known as tannins, tannic acids or more generally natural polyphenols.

It is well known that the phenolic substances the molecule of which contains at least two vicinal phenolic functions or a carboxylic function in ortho position relative to a phenolic function are likely to form, with the ferric ion, a complex molecule in which the iron atom is entrapped by three organic molecules.

The formation of ferric chelate causes the appearance of a blue colour the shade of which may vary according to the nature of the phenolic compound.

For instance, it is possible to use a ferric chelate by acting salicylic acid, thereby synthesizing a complex molecule in which the iron atom is linked to three organic molecules through ionic and semi-polar linkages.

The chemical reaction starts at the anodes of the metal where iron is ionized with liberation of electrons. It is according to that compound that the natural polyphenols are inhibiting rust.

For this purpose, it has already been suggested for a long time to use aqueous solutions of natural polyphenols from various plant sources. The molecular weight has a substantial influence on the efficiency of the product. Thus, quebracho epicatechin having only two phenolic functions likely to react forms, with iron, a slightly cross-linked chelate giving only a weak protection.

As opposed to the technics for inhibiting rust through natural polyphenols, it has been suggested to convert iron oxides with inorganic acids, more particularly phosphoric acid.

In that case, the mineral acid forms trivalent iron salts and bivalent iron salts with rust.

The ferrous and ferric phosphates are then covering the metallic surface, whereas the iron atoms are not linked to each other, thereby causing a lack of resistance to corrosive agents.

In an attempt to find a compromise and improve the protection of iron against corrosion, it has also been suggested to use, e.g. a mixture of polyphenols and phosphoric acid. However, the bivalent and trivalent iron salts are also adjoining to each other without any linkage.

In addition, since the polyphenol reacts more slowly than the inorganic acid, it cannot give rise to the stabilizing reaction with converted rust.

The rust inhibitor according to the object of the present invention consists of tannic acid, preferably tannic acid having a high purity and a high molecular weight.

It is essentially characterized in that it comprises at least a tannic acid, a catalyst for initiating the chelation of iron atoms and a cross-linking agent. The tannic acid will be preferably a tannic acid having a molecular weight higher than 2000 and a hydroxy phenolic function the function number of which is equal to or higher than 23.

Advantageously, a tannic acid shall be used chosen from the class of pyrogallic tannins, metapolygallic or gallic acid glucosides, ellagic acid glucosides, quinic esters of gallic or metapolygallic acids, characterized by a high purity of 85 to 95%, a complete solubility in ethanol, a viscosity comprised between 150 to 200 centipoises at 50% by weight in ethanol and at a temperature of 25° C.

The catalyst may be a saturated or unsaturated, organic, hydroxylated or non hydroxylated polycarboxylic, aliphatic, alicyclic or aromatic acid. The catalyst may be also a polysulfonic acid or an amino acid.

As generally as possible, the said catalyst may consist of an inorganic compound and, more particularly, such inorganic compound which forms an electron acceptor. The said inorganic compound may be also of the type considered as Lewis acid.

The thus defined catalysts are promoting the penetration of the inhibitor solution through the laminated layers of rust, they initiate and catalyse the chelation reaction of iron with tannic acid and they contribute to substantially improving the adherence of the ferric chelate to the metallic substrate. The chelation reaction of iron requires an absorption of the electrons liberated at the metal anodes. In this respect, since the inorganic compounds are functioning as Lewis acids or electron acceptors, they catalyse the chelation reaction. The aluminum salts such as aluminium sulphate, the iron salts such as ferric chloride and the tin salts such as stannic chloride permit to accelerate and to make the chelation reaction more uniform.

As regards the cross-linking agents, they have been introduced with the purpose of increasing the molecular weight of the ferric chelate, thereby making it still more resistant to corrosive agents. In this respect, by way of example, formaldehyde, saturated or unsaturated aliphatic dialdehydes such as glyoxal, aromatic dialdehydes, aliphatic diamines such as hexamethylene diamines and aromatic diamines such as paraphenylene diamine may be used.

Use of an at least difunctional organic compound having functions capable of reacting with tannic acid and bind together two or more ferrotannic chelate molecules will be advantageous.

As proven by several tests, the quantitative limits of the components of the rust inhibitor are essentially variable.

By way of example, preferred quantitative limits are given in the table hereafter:

| Components | Percentage by weight in the mixture | |
|---|---|---|
| | Minimum | Maximum |
| Tannic acid | 15 | 20 |
| Heavy solvent | 12 | 20 |
| Catalyst | 3 | 15 |
| Cross-linking agent | 3 | 15 |
| Volatile solvent | 15 | 35 |
| Water | 15 | 40 |

It will be noted that the composition of the rust inhibitor as herein defined is able to inhibit adhering rust thicknesses up to 500 microns thick.

The reaciton speed of iron and iron oxides chelation is a function of the hygrometic degree of the ambient atmosphere. The reaction is faster and more complete when the relative humidity of the atmosphere is more than 50%.

On the basis of carried out tests, applicant hereby declares that the study of the potentioncinetic curves of the rust treated by the herein defined inhibitor shows that the current corresponding to an imposed potential superior of +200 millivolts to the dissolution potential does not go above 0.10 milliamperes per square centimeter when measured in distilled water. Under the same conditions and at an identical potential, untreated rust presents a current of 0.40 milliampere per square centimeter.

The rust inhibitor according to the invention may be used in varying embodiments, more particularly of accordance with the intended effects and the requirements in the produced effects. Varying compositions may be also provided in accordance with the used components and the additional products having a side effect, it being understood that the one and the other are not modifying the principle of the rust inhibitor according to the invention.

EXAMPLE 1

15 parts of previously purified tannic acid and 14 parts of ethylene glycol monoethyl ether are mixed in a planetary kneader. It is heated to 60° C. with tumbling until a homogeneous sirupy paste is obtained. Then, there are added 6 parts of oxalic acid and 10 parts of 40% formaldehyde solution which are admixed with the mass.

The resulting paste is then diluted with 25 parts of isopropanol and 30 parts of water.

EXAMPLE 2

15 parts of previously purified tannic acid, 3 parts of maleic acid and 17 parts of glycol are mixed in a planetary kneader. It is then heated to 60° C. with tumbling until a homogeneous paste is obtained, whereupon there are added 10 parts of hexamethylene diamine which are incorporated into the mass. The paste is then diluted with 40 parts of water and 15 parts of isopropanol.

EXAMPLE 3

In a planetary kneader, are introduced 14 parts of ethylene glycol monoethyl ether which are heated to 60° C. under a good stirring. There are then introduced 15 parts of previously purified tannic acid which are completely dissolved in the solvent.

3 parts of malonic acid, 3 parts of paraphenylene diamine and 10 parts of a 1% ferric chloride solution are then successively added.

When a homogeneous mixture is obtained, the paste is diluted with 25 parts of water and 30 parts of isopropanol.

EXAMPLE 4

15 parts of previously purified tannic acid and 14 parts of ethylene glycol monoethyl ether are mixed in a planetary kneader. It is then heated to 60° C. until a homogeneous sirupy paste is obtained. Then 12 parts of glyoxal and 6 parts of phthalic acid are added.

The resulting mixture is diluted with 35 parts of isopropanol and 18 parts of water.

EXAMPLE 5

14 parts of ethylene glycol monoethyl ether, 15 parts of previously purified tannic acid and 2 parts of oxalic acid are introduced into a planetary kneader.

It is heated to 60° C. for 15 minutes, thereby obtaining a perfectly homogeneous mixture, whereupon 10 parts of a 2% aluminum sulphate solution and 4 parts of hexamethylene diamine are added.

The resulting paste is diluted with 30 parts of isopropanol and 25 parts of water.

The solution obtained in these various examples may be applied on a rusty surface previously cleared of non adhering scales. After several hours, a uniform layer of bluish black ferric chelate is obtained.

These typical examples are illustrating, on one hand, the permanency of the fundamental principle and, on the other hand, the large possible variations within the specific constituents.

These examples have not any limitative character.

What we claim is:

1. A rust inhibitor consisting essentially of 15 to 25% of tannins; 3 to 15% of a chelation catalyst selected from the group consisting of aluminum sulfate, ferric chloride, stannic chloride, maleic acid, oxalic acid, and phthalic acid; and 3 to 15% of a cross-linking agent selected from the group consisting of formaldehyde, glyoxal, hexamethylene diamine, and paraphenylene diamine.

2. The rust inhibitor of claim 1 also containing 12 to 20% of ethylene glycol monoethyl ether, 15 to 35%, 15 to 35% of isopropanol, and 15 to 40% of water.

3. A rust inhibitor according to claim 1, characterized in that the used tannic acid is a tannic acid having a high molecular weight, i.e. a tannic acid having a molecular weight higher than 2000 and a hydroxy phenolic function the function number of which is equal to or higher than 23.

4. A rust inhibitor according to claim 1, characterized in that the tannic acid is of the class of pyrogallic tannics.

5. A rust inhibitor according to claim 1, characterized in that the tannic acid is of the class of gallic or metapolygallic glucosides.

6. A rust inhibitor according to claim 1, characterized in that the tannic acid is of the class of ellagic acid glucoside.

7. A rust inhibitor according to claim 1, characterized in that the tannic acid is of the class of quinic esters of gallic or metapolygallic acids.

8. A rust inhibitor according to claim 1, characterized in that the tannic acid is of a high purity comprised between 85% to 95%, presents a complete solubility in ethanol, and a viscosity of 150 to 200 centipoises at 50% by weight in ethanol at a temperature of 25° C.

9. A rust inhibitor according to claim 1, characterized in that the cross-linking agent is formaldehyde.

References Cited

UNITED STATES PATENTS

| | | | |
|---|---|---|---|
| 3,085,975 | 4/1963 | Jennings | 252—181 |
| 3,375,200 | 3/1968 | Robertson | 252—84 |
| 3,578,508 | 5/1971 | Pearlman | 252—396 |

LEON D. ROSDOL, Primary Examiner

I. GLUCK, Assistant Examiner

U.S. Cl. X.R.

21—2.5 R, 2.7 R; 106—14; 148—6.1; 210—58, 59; 252—83, 84, 180, 181, 396, 8.55 E